United States Patent
Williams et al.

(10) Patent No.: US 9,891,867 B2
(45) Date of Patent: Feb. 13, 2018

(54) PROTOCOL FOR INTERACTION BETWEEN WIRELESS DEVICES AND OTHER DEVICES

(75) Inventors: Leon Williams, Walworth, NY (US); Patrick Wood, Lake Hopatcong, NJ (US); Jonathan Marsden, San Mateo, CA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 386 days.

(21) Appl. No.: 13/100,117

(22) Filed: May 3, 2011

(65) Prior Publication Data

US 2012/0113459 A1 May 10, 2012

Related U.S. Application Data

(60) Provisional application No. 61/412,287, filed on Nov. 10, 2010.

(51) Int. Cl.
*H04W 72/02* (2009.01)
*G06F 3/12* (2006.01)

(52) U.S. Cl.
CPC .......... *G06F 3/1206* (2013.01); *G06F 3/1209* (2013.01); *G06F 3/1226* (2013.01); *G06F 3/1244* (2013.01); *G06F 3/1288* (2013.01); *G06F 3/1292* (2013.01);
(Continued)

(58) Field of Classification Search
CPC .... G06F 3/1206; G06F 3/1209; G06F 3/1226; G06F 3/1288; G06F 3/1292
See application file for complete search history.

(56) References Cited

U.S. PATENT DOCUMENTS

| 6,424,841 B1 * | 7/2002 | Gustafsson | H04W 4/14 455/417 |
| 6,431,772 B1 * | 8/2002 | Melo | G06F 3/1204 358/1.15 |

(Continued)

FOREIGN PATENT DOCUMENTS

CN 101461227 A 6/2009

OTHER PUBLICATIONS

Slivka, Eric; "AirPlay Hacking: Streaming to Linux and Windows, DVD Streaming, and More"; Dec. 23, 2010; retrieved online from url: MacRumors.com/2010/12/23/airplay-hacking-sreaming-to-linux-and-windows-dvd-streaming-and-more/ ; 4 pages.
(Continued)

*Primary Examiner* — Vincent Rudolph
*Assistant Examiner* — Darryl V Dottin
(74) *Attorney, Agent, or Firm* — Perkins Coie LLP

(57) ABSTRACT

A proxy software service determines all I/O devices independent of subnet location, on a network; provides a network interface on a wireless subnet that can receive and respond to requests; responds to such requests for each I/O device so identified so that the I/O device is available to the wireless device user for device selection; transfers and translates, if necessary, the IPP stream received from the wireless device to the network address of the I/O device so that the I/O device simulates a compliant I/O device; and transfers and translates, if necessary, all necessary status and command messages from the present protocol to the protocol supported by a legacy I/O device.

22 Claims, 3 Drawing Sheets

(52) U.S. Cl.
CPC .......... *G06F 3/1207* (2013.01); *G06F 3/1259* (2013.01); *G06F 2206/1512* (2013.01); *H04W 72/02* (2013.01)

(56) References Cited

U.S. PATENT DOCUMENTS

| | | | | |
|---|---|---|---|---|
| 6,707,580 | B1* | 3/2004 | Bloomfield | H04L 12/58 358/1.15 |
| 7,010,294 | B1* | 3/2006 | Pyotsia | G05B 19/042 340/3.1 |
| 7,180,475 | B2* | 2/2007 | Slobodin et al. | 345/2.3 |
| 8,243,310 | B2* | 8/2012 | Suzuki et al. | 358/1.15 |
| 9,036,181 | B2* | 5/2015 | Chang | G06F 3/1245 358/1.1 |
| 2002/0116500 | A1* | 8/2002 | Arora et al. | 709/227 |
| 2003/0030843 | A1 | 2/2003 | Qiao | |
| 2004/0100651 | A1 | 5/2004 | Leone et al. | |
| 2004/0125782 | A1 | 7/2004 | Chang | |
| 2004/0167974 | A1 | 8/2004 | Bunn et al. | |
| 2005/0041118 | A1 | 2/2005 | Suk | |
| 2006/0023916 | A1* | 2/2006 | Yang et al. | 382/103 |
| 2007/0177192 | A1* | 8/2007 | Wang | 358/1.15 |
| 2010/0138761 | A1* | 6/2010 | Barnes | 715/764 |
| 2010/0164970 | A1* | 7/2010 | Lyons et al. | 345/545 |
| 2011/0141887 | A1* | 6/2011 | Klein et al. | 370/230 |
| 2011/0162048 | A1* | 6/2011 | Bilbrey et al. | 726/4 |
| 2011/0246893 | A1* | 10/2011 | Paas et al. | 715/732 |
| 2011/0267641 | A1* | 11/2011 | Stacy | 358/1.15 |
| 2012/0179584 | A1* | 7/2012 | Woycik et al. | 705/27.1 |

OTHER PUBLICATIONS

Slivka, Eric; "AirPlay Reverse Engineered to Send Video from iOS Devices to Macs"; Dec. 14, 2010; retrieved online from website: MacRumors.com; 3 pages.

Frakes, Dan; "Printopia 1.0.2"; Mar. 2011; Macworld, p. 16.

* cited by examiner

PROTOCOL FOR INTERACTION BETWEEN WIRELESS DEVICES AND OTHER DEVICES

CROSS REFERENCE TO RELATED APPLICATIONS

This application claims priority to U.S. provisional application Ser. No. 61/412,287, filed Nov. 10, 2010, which application is incorporated herein in its entirety by this reference thereto.

BACKGROUND OF THE INVENTION

Technical Field

The invention relates to the interaction of wireless devices with other devices. More particularly, the invention relates to a protocol for interaction between wireless devices and other devices.

Description of the Background Art

Handheld, wireless devices are now more than just mobile telephones and MP3 players. Apple's iPhone and smart phones employing Google's Android are examples of state of the art handheld and/or portable devices that provide functionality not even dreamt of just a few years ago. In this connection, Apple's mobile operating system, iOS, includes a feature, AirPrint, that allows printing between handheld devices, such as Apple's iPhone, and a printer. To print, an iOS device, such as an iPad or iPhone, broadcasts an IPP message using Apple's service discovery protocol, Bonjour, with a message requesting that all printers which support a new universal format, e.g. AirPrint, respond. Note that this message is ignored by all printers to date with the exception of a new HP printer designed specifically for this type of printing. Printers responding to this request are then listed in the iOS user interface as a possible selection for the user. When the user selects a specific printer, the iOS device then opens a connection to the selected printer and submits the print job using the IPP protocol.

The broadcast request does not pass across routers to different subnets. Thus, iOS printing is limited to printers that are present on the subnet on which the iOS device is connected. iOS interaction with networked devices according to the state of the art is therefore limited to printing, to a printer that is specifically enabled to operate with a particular protocol, i.e. iOS AirPrint, on a local subnet. As such, the state of the art provides only minimal interaction between such wireless devices and printers, and provides no interaction with other devices.

It would be advantageous to provide a protocol that allowed wireless devices and other similar devices to interact with any other devices.

SUMMARY OF THE INVENTION

An embodiment of the invention addresses, inter alia, the above limitations found in, for example, iOS printing deployment in existing networks and printer systems, i.e. the need to modify existing printers to support the new, universal IPP protocols; the need for these printers to exist on the same subnet as the handheld wireless device (note that many larger network infrastructures separate the wireless and wired networks to different subnets for security and bandwidth reasons); and the fact that the only interaction between the handheld wireless device and a printer is supported.

A presently preferred embodiment of the invention provides a proxy software service that:

1) Determines all input/output (I/O) devices, such as printers, independent of subnet location, on a network by alternative means, e.g. SNMP, Fiery discovery protocol;
2) Provides a network interface on a wireless subnet that can receive and respond to, e.g. iOS Universal IPP requests;
3) Responds to, e.g. such iOS IPP requests for each I/O device identified in Step 1 above so that the I/O device is available to the wireless device user for device selection;
4) Transfers and translates, if necessary, the IPP stream received from the wireless device to the network address of the I/O device so that the I/O device simulates a compliant iOS I/O device; and
5) Transfers and translates, if necessary, all necessary status and command messages to or from the iOS protocol from or to the protocol supported by the pre-iOS I/O device, e.g. print complete, error.

The proxy software service has network interfaces that can communicate with different subnets on which the I/O devices are connected, i.e. when the I/O devices are connected on different wireless subnets, and/or different wired subnets.

By installing and using the proxy software service, it is possible to enable, e.g. iOS device printing with legacy, i.e. non-iOS compliant, devices such as printers without modification of either iOS software or legacy device software. Additionally, selections can be added into the protocol translation effected by the proxy software service to enable I/O device features that are not presented to the user from the wireless device user interface. For example, with regard to a printer, features such as stapling, two-up printing, booklet printing, etc. can be selected on the legacy printer from an operator interface that controls the proxy software service.

DETAILED DESCRIPTION OF THE INVENTION

An embodiment of the invention addresses, inter alia, the above limitations found in, for example, iOS printing deployment in existing networks and printer systems, i.e. the need to modify existing printers to support the new, universal IPP protocols; the need for these printers to exist on the same subnet as the wireless device (note that many larger network infrastructures separate the wireless and wired networks to different subnets for security and bandwidth reasons); and the fact that the only interaction between the wireless device and a printer is supported.

Figure 1:
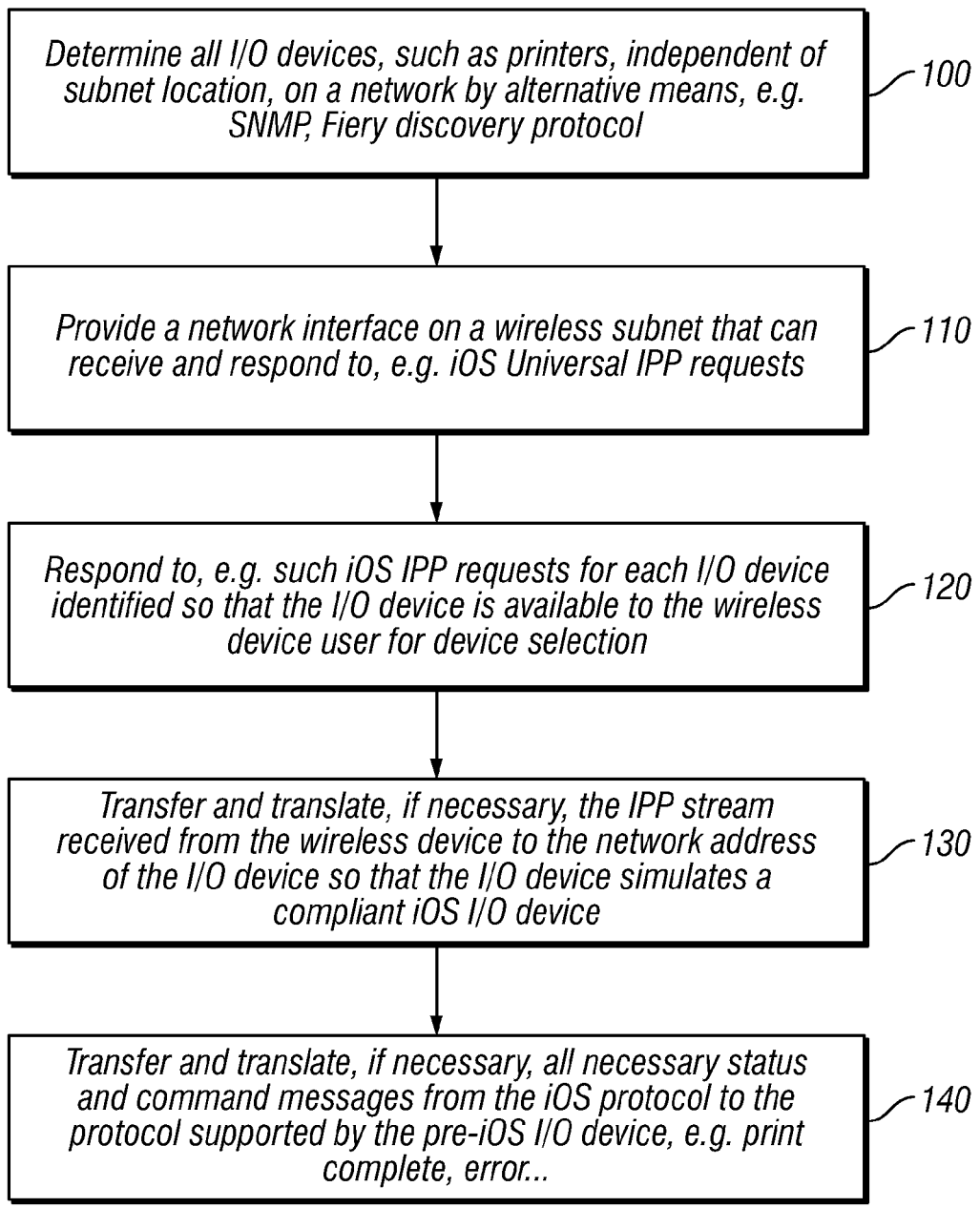
FIG. 1 is a flow diagram showing a protocol for wide area interaction between wireless devices and other devices according to the invention.

FIG. 1 is a flow diagram showing a protocol for wide area interaction between wireless devices and other devices according to the invention. As shown in FIG. 1, a presently preferred embodiment of the invention provides a proxy software service that:

1) Determines all I/O devices, such as printers, independent of subnet location, on a network by alternative means, e.g. SNMP, Fiery discovery protocol (100);
2) Provides a network interface on a wireless subnet that can receive and respond to, e.g. iOS Universal IPP requests (110);
3) Responds to, e.g. such iOS IPP requests for each I/O device identified in Step 1 above so that the I/O device is available to the wireless device user for device selection (120);
4) Transfers and translates, if necessary, the IPP stream received from the wireless device to the network address of the I/O device so that the I/O device simulates a compliant iOS I/O device (130); and
5) Transfers and translates, if necessary, all necessary status and command messages to or from the iOS protocol from or to the protocol supported by the pre-iOS I/O device, e.g. print complete, error (140).

The proxy software service has network interfaces that exist both on the wireless subnet, as well as the wired subnet on which the I/O devices are connected (for example, see FIGS. 2-6).

By installing and using the proxy software service, it is possible to enable, e.g. iOS device printing with legacy, i.e. non-iOS compliant, devices such as printers without modification of either iOS software or legacy device software. Additionally, selections can be added into the protocol translation effected by the proxy software service to enable I/O device features that are not presented to the user from the handheld wireless device user interface. For example, with regard to a printer, features such as stapling, two-up printing, booklet printing, etc. can be selected on the legacy printer from an operator interface on the wireless device that controls the proxy software service.

A first embodiment of the invention enables I/O device discovery across an enterprise network topology. For purposes of the discussion herein, the I/O device can be any device that is connected to a network, such as a printer, projector, network storage device, optical device, and the like. The wireless device can be any wireless device having a lightweight OS, such as an iPad or iPhone, operating Apple's iOS, an Android phone, operating Google's Android OS, and the like. Such devices are not necessarily handheld, but are portable or mobile wireless devices. Such devices are typically, but not necessarily, limited to local subnet access.

In the iOS example, the Bonjour protocol that Apple uses for iPhone and iPad requests a multicast packet. Only printers that are on the local subnet can answer that request. The protocol for the particular packet that Apple uses is not to be routed across subnets. This embodiment provides discovery across a global network, such as a global wired network. An application which is a proxy on the local subnet where the wireless device, e.g. the iPad is connected represents I/O devices, such as printers of the global network as local devices on the subnet, then routes information from the wireless device that is printing through the local subnet via the proxy to the global network to the destination I/O device, e.g. for printing. One advantage thus provided is that all network I/O devices, such as printers, across an entire facility, for example, are available on a single local subnet, amongst which the iPad can then select and access.

A presently preferred embodiment of the invention comprises a proxy software service that can be delivered to an enterprise for use on an existing server or delivered to a location as a computer preloaded with the proxy software service. Printer discovery does not have to be compatible with the protocol. It could use any device discovery protocol, e.g. EFI's Fiery discovery protocol or SNMP. In the example of Apple's iOS, the proxy software service is not a device that is specifically enabled for Apple's Bonjour. It is only necessary to know that there is a device that knows where all the different printers are, for example, in the enterprise. The proxy software service is local to the iPad and it implements Bonjour on the iPad side so that it knows how to show up in the iPad device, and implements any desired device discovery protocol on the enterprise side. Thus, this embodiment of the invention uses existing protocols, defines I/O devices, such as printers, and then becomes a proxy to represent those existing I/O devices with the new protocol of the wireless device on the subnet, e.g. to make legacy printers work with iPad or iOS software. As such, it is not necessary to buy a special printer that has a special module built into it for the wireless device protocol, nor is it necessary to locate all printers at a particular subnet to allow them to be accessed by a wireless device.

If the printer only supports a known page description language (PDL), such as PS, PDF, PCL, or others and the PDL delivered by the iOS device is not compatible with that of the printer, then a proxy solution is provided to translate the iOS supplied data stream into one that is supported by the legacy printer. A preferred embodiment of the invention contemplates an enterprise where a wireless network is on one subnet and fleet printers are on a different subnet. This embodiment of the invention allows an IT department to manage legacy printers such that they work with mobile printing solutions. The invention is also useful in small office situations where either the discovery protocol or data stream from the legacy printer must be adapted to those supplied by the iOS device.

Another embodiment of the invention extends the mobile device to any I/O facility, such as a projector. Thus, a projector or other device can be used either with, for example, an iPad or iPhone. In such embodiment, the projector appears to the mobile device as an iOS printer. The projector collects the information. The user can use, for example, iPhone or iPad applications to select a next slide, previous slide, and so forth. This allows a user to get information easily from the iPad to the projector and then start up an application that allows the user to control which slide is being displayed. Instead of using PowerPoint or the iPad PowerPoint equivalent, the portable device sends video or pictures/images. Thus, the user could send any kind of information via the portable device, whether it is PowerPoint, Word, PDF, video information, etc.

An embodiment of the invention can be used for streaming, or for anything else, for example, onto an HDTV. For example, a user can put video clips and audio clips into PDF files.

Ignoring Apple's solutions for the moment and considering BLACKBERRY devices and other devices, an embodiment of the invention provides a mechanism whereby a user can mail out a presentation to a projector or some other server, which then replies back to the BLACKBERRY device with a URL that then brings up a Web page on the BLACKBERRY device, and which allows the user to control the projector from the BLACKBERRY device, in addition to forwarding the presentation to the projector (via email) from the BLACKBERRY device. If the user has an implementation of the invention, he can easily walk into a room with a BLACKBERRY device and mail a presentation to a proxy device implementing the invention. The presentation shows up, and the user can control it from the BLACKBERRY device without having to bring in a PC or connect anything.

A further embodiment of the invention provides an extension, e.g. a superset of the projector, in which the herein disclosed proxy not only can spoof a printer to operate a projector, but can spoof the printer to do other things. It is not necessarily constrained to a projector application. Thus, this embodiment extends the invention, for example, to a translation application where a user sends information from a portable device to a projector, and projected on the screen is a translation of the information.

The invention also provides a mechanism to move the data and get the information back in a different way. Thus, the invention also finds use in prepress applications and offset printing solutions; sending music files and player controls to an audio system for playback; and sending data files to a file server for backup or storage.

A challenge with the iPhone or iPad is that these devices do not allow a user access to the files they contain. There is no global file system on the iPhone. There is no mechanism to go in and manipulate files. With the herein disclosed print mechanism it is possible to access files and transfer those files from the portable device. The invention therefore provides a conduit that allows a user to access to files on the portable device from different applications, whether they are photos, PDFs, PowerPoint, etc., transfer information in the files from the portable device, and then use it in a different way. Thus, the invention provides a form of file transfer protocol for devices that do not allow such file transfer, such as iOS devices. The invention also allows application kick-off, i.e. once the file is transferred to a remote device, such device can do something with it.

Each iPhone application knows what their particular data looks like, but no application has access to the other applications' data. It is not a global file system. It is like a local file system in which each application knows what it is doing. By accessing and manipulating. for example, the iOS protocol, an embodiment of the invention provides a global mechanism for printing. Each one of the applications on the iOS-type device that supports printing has a mechanism that can be exploited by the invention to export information from the iOS-type device automatically. It is the inventor's recognition of this aspect of such devices that allows a user to access the data within each application on the wireless device.

An Embodiment Supporting the Use of a Projector

The following discussion concerns an embodiment of the invention that allows a mobile device to print to a projector. Those skilled in the art will appreciate that this embodiment is provided for purposes of illustration and example only. As discussed above, the invention readily addresses the problem of printing from a portable device across domains and sub-nets to any type of I/O device, whether or not such device uses the same protocol as the portable device, even if the portable device does not provide a file hierarchy for access to data stored thereon.

In business meetings, the predominant method of sharing information to a group of people is the video projector. Whether in technical, sales, marketing or management meetings, the projector is used to display both the meetings bullet points, as well as supplemental information to the participants. However, all too often setting up the video projection system is problematic and encroaches into the meetings allotted time. Problems include, finding the right video cable and adaptor, booting the presenter's computer, selecting the correct resolution, finding the presentation file, low batteries, and many others. The time needed to correct these issues results in lost productivity, lost opportunity, and personnel inconvenience. To prevent these issues, an embodiment of the invention provides a system that enables presentations to be retrieved, transmitted, displayed, and controlled from mobile devices, such as smart phones, tablet computers, and other personal devices.

Key to this solution is a modified or enhanced video projector system. The modifications can be built into the projector or added to an existing (non-enhanced) projector through the use of an external converter box. Modifications are made to the projector, as opposed to the mobile devices or smart phones, because these comprise fewer units and are typically shared, and so can carry the additional cost burden of the enhancement. An enhanced projector is linked to the network via wired or wireless connections, such as Wi-Fi, Bluetooth, infrared, or other networking technologies. To initiate the projection session, the presenter instructs their mobile device to transmit the required files to the projector over the network via email, sockets, print streams, URL, or other well-known protocols. The enhanced projector receives these files and responds to the presenter with an id token in the form of email, socket, URL, or other well-known protocol. The presenter then uses this id token to launch an application that controls the projector in the subsequent session's start, display enable, display blank, slide/page selection of next and previous, session deletion and session end projection functions. Note that if no application is feasible for mobile device, a separate remote control can be made available to the presenter.

As a practical implementation on Apple's popular iOS used in the iPhone and iPad mobile devices, the feature of printing can be overloaded. Because this function is built into the operating system, it is available for all well-known file types and applications, such as email and Internet browsers. By designing the enhanced projector to respond to network protocols as if it were a printer, the enhanced projector can receive all the slides/pages required for display from the printing function. The presenter simply needs to instruct the mobile device to print the desired information for it to be received by the projector. The projector then prepares the received print information for display on the video projector. Simultaneously, the projector responds to the presenter by sending back to the mobile device the required id token in the form of a push message. This message generates a pop-up message on the presenter's mobile device that is used to invoke the enhance projector's application. The application is then used to control the presentation of the slides/pages during the meeting.

In this embodiment the projector (adaptor) creates a WiFi hotspot to establish an independent network. The projector (adaptor) provides a Bluetooth connection for local connection. The portable device sends partial/complete files to the projector (adaptor) rather than a video stream. Raster files are used in this embodiment for minimum CPU load on the projector. Compressed raster files are used in this embodiment to conserve bandwidth. Vector files, e.g. PS, PDF, SVG, can be used to support interactive scale, zoom, and rotation. File reference is via a URL to load content from the Web, repositories, clouds, etc. File type based rasterization is used on the projector (Word, .ppt, .pdf, .xls, etc., 3D stereoscopic formats are also supported (autodesk, 3ds, maya).

The projector emulates printer network protocols for compatibility with application software. Installable printer drivers can be provided to access projector and setup options, emulate universal print formats (such as those in iOS 4.2), and define universal projector formats when the projector driver is added to an OS.

The projector responds to the network address of a computer sending files to the projector. A popup or push message can be used to launch the application that is used to control the projector. An email message with a URL can also be used to control the application. Projection of a URL selection on-screen allows browser control of projection functions. The application is used to control what is displayed by the projector, e.g. display a URL of the application with projector for users to load the application the first time, forward/backward function, blank/unblank function, skip to slide number (selected via numeric input or icon display), select artistic transitions, fade, peel, dissolve, zoom, pan, rotate on slide projector view via mouse or gesture, simulate pointer (laser/hand) on projector view via mouse or gesture, control streaming of video content from the Web under control of the projector application, picture-in-picture of Web content with file presentation (HTML pages, streaming video, etc.). Audio can also be sent from the application, Web URL, repository in addition to a presentation.

The application can also control which presentation session is active, display numbers/icons on projector to gain control of projector session, enable only room occupants to control what is projected, secure access to files on projector via authentication schemes (LDAP . . . ), secure delete of projection files, provide automatic delete of projection files (end of session, time based . . . ), provide automatic update/reload of remote URL content (presentation revisions), provide master/slave control to support multiple projectors in multiple locations, provide audio streaming between master/slave to support multiple locations, provide file presentation search on projector to select from multiple files, and provide dumb IR remote to control slide presentation (no mobile device needed).

The following discussion provides specific examples of the projector-based embodiment of the invention. Those skilled in the art will appreciate that the examples provided for a projector can be applied to any other device, such as a printer, pre-press and offset printing facility, translation facility, display, audio system, recording facility, and the like.

Figure 2:
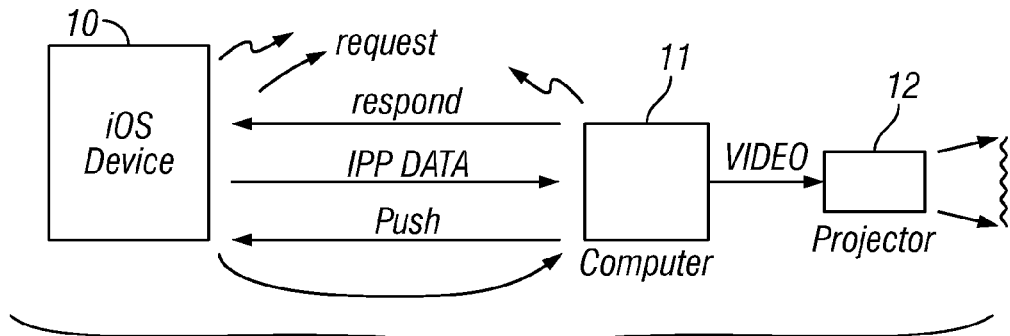
FIG. 2 is a block schematic diagram showing an embodiment of the invention in which an iOS device prints to a projector using a raster image processor (RIP) on the device itself.

FIG. 2 is a block schematic diagram showing an embodiment of the invention in which an iOS device prints to a projector using a raster image processor (RIP) on the device itself. In FIG. 2, an iOS device 10 sends a request in the form of a discovery message (IPP Universal). A computer 11 connected to the projector 12 responds to the iOS device as if it were a printer. The computer can be internal to the projector or it can be an external computer in communication with the projector. In some embodiments, the projector has a minimal network stack and wired/wireless NIC that only displays bitmaps (optionally videos) pushed from the proxy server. The proxy server handles all discovery and IPP requests with minimal interaction with the projector computer, for example, reading the PDM MIB via SNMP. The proxy server forwards the PDF (or other format) file directly to the cloud RIP and gets the bitmaps back. The only information sent to the projector is the images/videos during the presentation. In other words, the proxy server hardware is the projector computer.

In the embodiment of FIG. 2, the iOS device rasterizes the pages of a document to be sent and sends bit maps to the computer in the form of IPP rasters. The computer collects the rasters for display on the projector. The computer responds to the iOS device with a 'push' message that requests the user to open a custom projector application on the iOS device. The user opens the projector application and uses it to control slide display on the projector.

Figure 3:
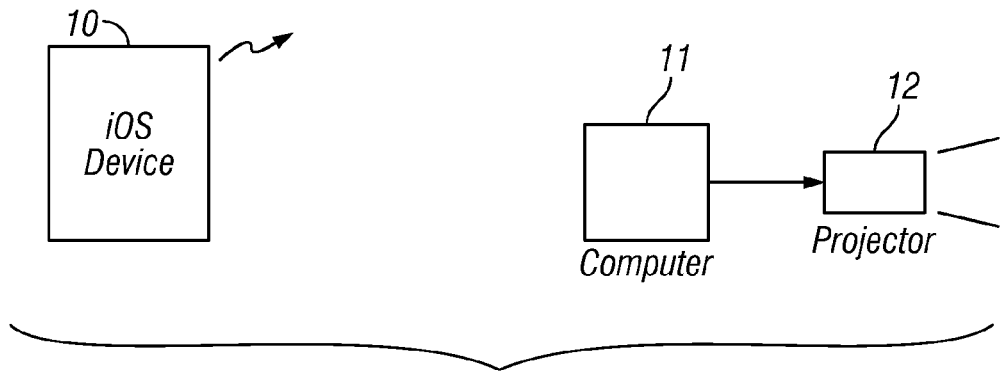
FIG. 3 is a block schematic diagram showing an embodiment of the invention in which an iOS device prints to a projector using a RIP on the projector.

FIG. 3 is a block schematic diagram showing an embodiment of the invention in which an iOS device prints to a projector using a RIP on the projector. In FIG. 3, the iOS device 10 sends a discover message (IPP Universal). A computer 11 connected to a projector 12 responds to the discover message. The iOS device sends a .pdf file to the computer. Note that any other file format can be used, if supported by the computer. The computer rasterizes the .pdf file. The computer then responds to the iOS device with a 'push' message that requests the user to open a custom projector application on the iOS device. The user opens the projector application and uses it to control slide display on the projector.

Figure 4:
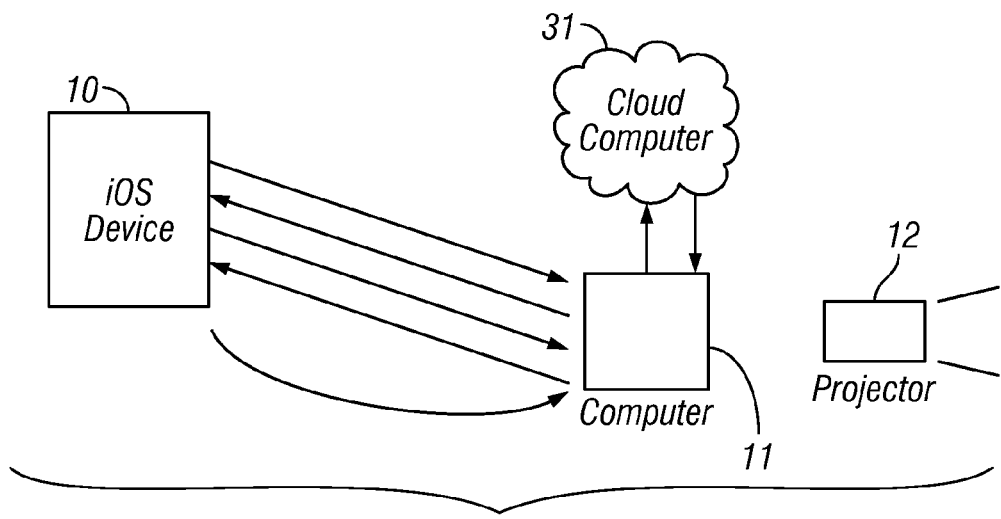
FIG. 4 is a block schematic diagram showing an embodiment of the invention in which an iOS device prints to a projector using a wide area network-based RIP.

FIG. 4 is a block schematic diagram showing an embodiment of the invention in which an iOS device prints to a projector using a wide area network-based RIP. In FIG. 4, an iOS device 10 sends a request in the form of a discovery message (IPP Universal). A computer 11 connected to the projector 12 responds to the iOS device as if it were a printer. The iOS device then sends a .pdf (or other format) file to the computer for the projector. The computer sends the .pdf file to the cloud for raster image processing (RIP). For purposes of the discussion here, the cloud can be a network of any type, e.g. an enterprise, the Internet, etc. After a facility or entity in the cloud processes the .pdf file, the resulting rasters are sent back to the computer. The computer then responds to the iOS device with a 'push' message that requests the user to open a custom projector application on the iOS device. The user opens the projector application and uses it to control slide display on the projector.

Figure 5:
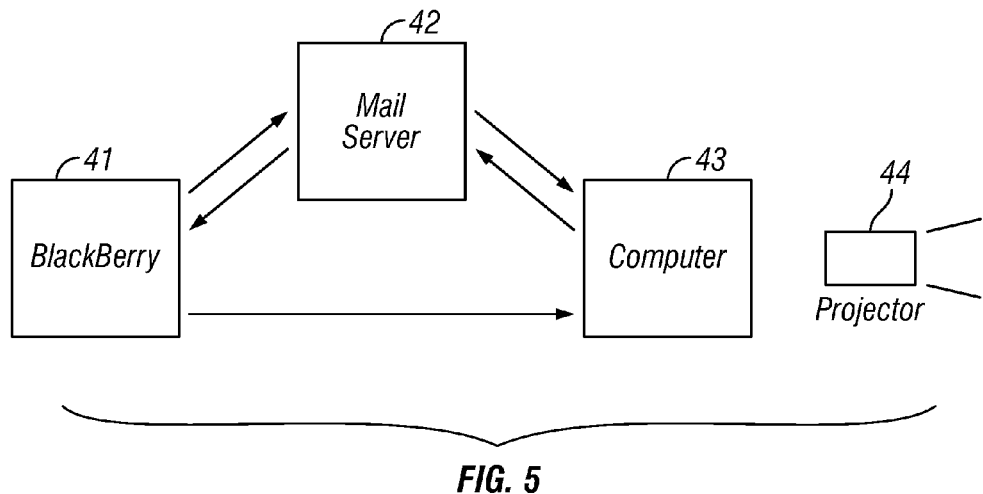
FIG. 5 is a block schematic diagram showing an embodiment of the invention in which a mobile device prints to a projector using a mail server.

FIG. 5 is a block schematic diagram showing an embodiment of the invention in which a mobile device prints to a projector using a mail server. In FIG. 5, a BLACKBERRY device 41 (or similar device) is used to mail (via a mail server 42) a presentation to a computer 43 as an email attachment. The computer rasterizes the attachment and responds to the BLACKBERRY device with an email that includes a link (URL) to the rasters, i.e. the computer acts as a web server. The BLACKBERRY device opens the link in a browser application to control the projector 44.

Figure 6:
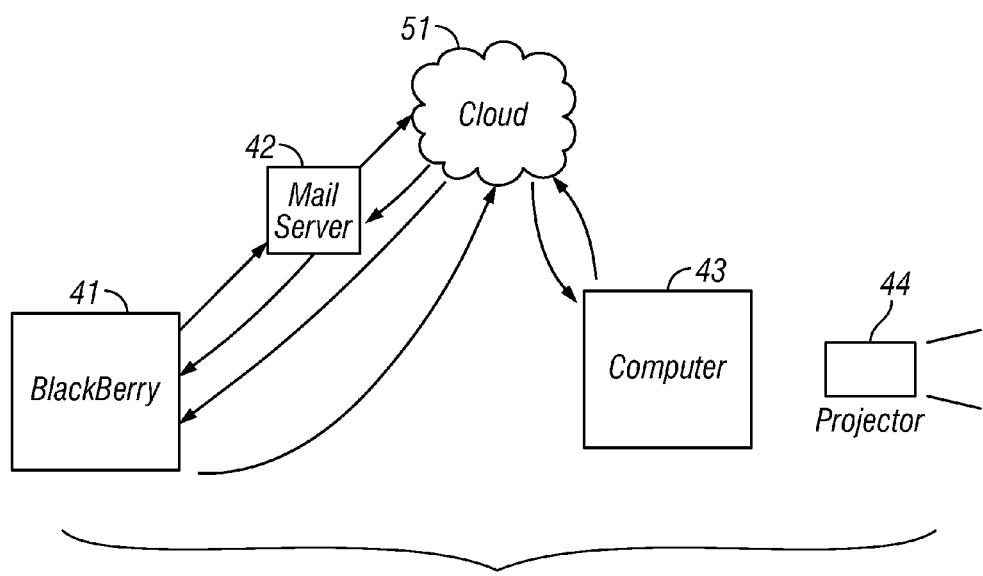
FIG. 6 is a block schematic diagram showing an embodiment of the invention in which a mobile device prints via a wide area network to a projector.

FIG. 6 is a block schematic diagram showing an embodiment of the invention in which a mobile device prints via a wide area network to a projector. In FIG. 6, a BLACKBERRY device 41 is used to email a presentation as an email attachment, via a mail server 42, to the cloud 51. For purposes of the discussion here, the cloud can be a network of any type, e.g. an enterprise, the Internet, etc. After a facility or entity in the cloud processes the .pdf file, links to the resulting rasters are sent back to the BLACKBERRY device via email. The rasters are accessible via links within the email. At a time before the BLACKBERRY device sends the email, or upon a request, the computer 43 registers its name with the cloud. This becomes the name of the projector that will appear on the BLACKBERRY device. The cloud uses requests for the name as the name for the projector to display the presentation. The selecting of a link in the email message at the BLACKBERRY device navigates the BLACKBERRY device to a web page. The BLACKBERRY device selects and/or enters the name of the projector at this web page and then uses this web page to navigate slides at the projector. The cloud relays the user entered page control instructions to the computer and control of the projector is thus effected.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising the steps of:
providing a network interface on a local wireless subnet and in communication with a global network, the network interface configured to receive and respond to a particular type of Internet Printing Protocol (IPP) request, the global network including a plurality of wireless subnets and a plurality of wired subnets, wherein a handheld wireless device is connected to the local wireless subnet, wherein the handheld wireless device is limited to communication with local input/output (I/O) devices only within, and not beyond, the local wireless subnet via a broadcast request in a first protocol that cannot pass across routers to different subnets beyond the local wireless subnet;
presenting, via the network interface, a plurality of I/O devices connected on the global network and beyond the local wireless subnet, wherein the plurality of I/O devices are presented for device selection by a user of the handheld wireless device, wherein each of the plurality of I/O devices is configured to operate using a second protocol, the first protocol being different from the second protocol such that the plurality of I/O devices are non-compliant with the first protocol;
receiving, via the network interface, a selection, from the user of the handheld wireless device, of an I/O device from the plurality of I/O devices;
receiving, via the network interface, an IPP request stream of the particular type, said IPP request stream intended for said selected I/O device;
translating, by the network interface, the IPP stream request from the first protocol to the second protocol;
presenting, by an operator interface, one or more selections representing one or more I/O features of said selected I/O device, wherein said one or more I/O features are not presented to the user from a user interface of the handheld wireless device;
receiving, from the operator interface, at least one particular selection from said one or more selections, said at least one particular selection representing at least one I/O feature of said selected I/O device;
adding said at least one particular selection to the translation in the second protocol to enable the at least one I/O feature of said selected I/O device;
transferring, by the network interface, the translated IPP stream request to the selected I/O device;
translating and transferring status and command messages from or to the first protocol to or from the second protocol;
presenting to said handheld wireless device a link that allows access to an I/O device control page of said selected I/O device via said handheld wireless device; and
said I/O device control page allowing to control said I/O device from said handheld wireless device.

2. The method of claim 1, further comprising the step of:
for a second selected input/output (I/O) device that is non-compliant with said handheld wireless device:
transferring and translating data received from said handheld wireless device on said local wireless subnet to a network address of the second selected I/O device, wherein the translated data enables the second selected I/O device to simulate a device that is compliant with the handheld wireless device; and
transferring and translating status and command messages from or to the first protocol associated with the handheld wireless device to or from a protocol supported by said second selected I/O device.

3. The method of claim 1, wherein said handheld wireless device is a printer and said features comprise any of stapling, two-up printing, and booklet printing.

4. The method of claim 1, wherein said input/output (I/O) device comprises any of a printer, projector, network storage device, and optical device.

5. The method of claim 1, further comprising the steps of:
receiving, at a server through the network interface, said data from a user using the handheld wireless device, said data in a form of a presentation, said server in communication with said selected I/O device via the global network;
said server forwarding said presentation to said selected I/O device;
said server replying to said handheld wireless device with a link that allows access to an I/O device control page via said handheld wireless device, wherein said I/O device control page allows said user to control said I/O device from said handheld wireless device.

6. The method of claim 1, wherein said selected I/O device comprises a translation application for converting said data from the first protocol to the second protocol that is different.

7. The method of claim 1, further comprising the steps of:
for a particular handheld wireless device that does not allow file transfer, said network interface configured to provide a conduit for user access to particular data on said particular handheld wireless device; and
said network interface configured to transfer said particular data from said particular handheld wireless device to effect a file transfer protocol for said particular handheld wireless device.

8. The method of claim 1, further comprising the step of:
enabling, via the network interface, said handheld wireless device to send print data to a projector using a raster image processor (RIP) that is resident on the handheld wireless device.

9. The method of claim 1, further comprising the step of:
enabling said handheld wireless device to send print data to a projector using a RIP on the projector.

10. The method of claim 1, further comprising the step of:
enabling said handheld wireless device to send print data to a projector using a wide area network-based RIP.

11. The method of claim 1, further comprising the step of:
enabling said handheld wireless device to send print data to a projector using a mail server.

12. The method of claim 1, further comprising the step of:
enabling said handheld wireless device to send print data to a projector via a wide area network.

13. A non-transitory computer-readable medium having stored thereon program instructions which, when executed by a processor, implement the method of claim 1.

14. The method of claim 1, wherein the first protocol is an iOS protocol that is translated to a pre-iOS protocol supported by said selected I/O device.

15. The method of claim 8, further comprising the steps of:
enabling said handheld wireless device to send a request in a discovery message form;
enabling a computer associated with the projector to respond to the handheld wireless device as if the computer were a printer that is compliant with the handheld wireless device;
enabling the handheld wireless device to rasterize a document to be sent to said projector;
enabling said handheld wireless device to send said rasterized document to the computer;
enabling said computer to collect said rasterized document for display on the projector;
enabling said computer to respond to the handheld wireless device with a 'push' message that requests a user to open a projector application on the handheld wireless device, wherein the projector application enables user control of document display on the projector.

16. The method of claim 9, further comprising the steps of:
enabling said handheld wireless device to send a request in a discovery message form;
enabling a computer associated with the projector to respond to the handheld wireless device as if the computer were a printer that is compliant with the handheld wireless device;
enabling said handheld wireless device to send a document file to the computer, said computer rasterizing-said document file for display on the projector, said computer responding to the handheld wireless device with a 'push' message that requests a user to open a projector application on the handheld wireless device, wherein the projector application enables user control of document display on the projector.

17. The method of claim 10, further comprising the steps of:
enabling said handheld wireless device to send a request in a discovery message form;
enabling a computer associated with the projector to respond to the handheld wireless device as if the computer were a printer that is compliant with the handheld wireless device;
enabling said handheld wireless device to send a document file to the computer for the projector;
enabling the computer to send the document file to a network-based facility for raster image processing (RIP) wherein, after said network-based facility processes the document file, said facility sending resulting rasters to the computer for display with the projector;
enabling said computer to respond to the handheld wireless device with a 'push' message that requests a user to open a projector application on the handheld wireless device, wherein the projector application enables user control of document display on the projector.

18. The method of claim 11, further comprising the steps of:
receiving, at a computer via a mail server, a presentation as an email attachment from said handheld wireless device;
wherein the computer rasterizes the attachment;
said computer responding to the handheld wireless device with an email that includes a link to the rasterized attachment, wherein the link is configured to be opened in a browser application to enable the handheld wireless device to control the projector.

19. The method of claim 18, further comprising the steps of:
using said handheld wireless device to email a document file via a mail server as an email attachment to a network-based facility for raster image processing (RIP);
after said network-based facility processes the document file, said network-based facility sending resulting rasters to the handheld wireless device in an email via said email server, wherein the rasters are accessible via links within the email;
at a time before the handheld wireless device sends the email, or upon a request, a computer registers its name with the network as the name of the projector that appear on the handheld wireless device;
the network uses requests for the name as the name for the projector to display the rasters;
selecting a link in the email at the handheld wireless device to navigate the handheld wireless device to a web page;
the handheld wireless device selecting and/or entering the name of the projector at the web page;
using the web page to navigate slides at the projector; and
said network relaying user entered page control instructions to the computer to effect control of the projector.

20. An apparatus for transferring a particular type of Internet Printing Protocol (IPP) request between a handheld wireless device and a selected input/output (I/O) device, comprising:
for said transfer of said particular type of IPP, a network interface configured to connect a local wireless subnet to which said handheld wireless device is connected and a plurality of subnets to which a plurality of I/O devices are connected, the plurality of subnets including a plurality of wireless subnets and a plurality of wired subnets, wherein said handheld wireless device is only able to communicate within, and not beyond, the local wireless subnet via a broadcast request that cannot pass across routers to different subnets beyond the local wireless subnet;
said network interface configured to present said plurality of I/O devices on said plurality of subnets and to receive and respond to requests from said handheld wireless device on said local wireless subnet, wherein the handheld wireless device is configured to operate using a first protocol and each of the plurality of I/O devices is configured to operate using a second protocol, the first protocol being different from the second protocol such that the plurality of I/O devices are non-compliant with the first protocol;
said network interface configured to receive, via the network interface, an IPP request stream of the particular type, said IPP request stream intended for said selected I/O device;
said network interface configured to translate the IPP stream request from the first protocol to the second protocol;
an operator interface configured to present one or more selections representing one or more I/O features of said selected I/O device, wherein said one or more I/O features are not presented to the user from a user interface of the handheld wireless device;
said network interface further configured to receive from said operator interface at least one particular selection from said one or more selections, said at least one particular selection representing at least one I/O feature of said selected I/O device;

said network interface further configured to add said at least one particular selection to the translation in the second protocol to enable the at least one I/O feature of said selected I/O device;

said network interface configured to transfer the translated IPP stream request to the selected I/O device;

said network interface configured to translate and transfer status and command messages to or from the first protocol to from or to the second protocol;

said network interface configured to present to said handheld wireless device a link that allows access to an I/O device control page of said selected I/O device via said handheld wireless device; and said I/O device control page allowing to control said I/O device from said handheld wireless device.

21. The apparatus of claim 20 further comprising:

a second selected input/output (I/O) device that is non-compliant with said handheld wireless device;

said network interface configured to enable the second selected I/O device to simulate a device that is compliant with said handheld wireless device on said wireless subnet; and said processor configured to transfer and translate status and command messages to or from the first protocol associated with the handheld wireless device from or to a protocol supported by said second selected I/O device.

22. The apparatus of claim 20, wherein the first protocol is an iOS protocol that is translated to a pre-iOS protocol supported by said selected I/O device.

* * * * *